United States Patent [19]

Johnson

[11] 4,382,866

[45] May 10, 1983

[54] ELECTRO-CHEMICAL SYSTEM FOR LIQUID FILTRATION

[76] Inventor: Dennis E. J. Johnson, 1025 Garfield Ave., Aurora, Ill. 60506

[21] Appl. No.: 325,817

[22] Filed: Dec. 2, 1981

Related U.S. Application Data

[63] Continuation-in-part of Ser. No. 213,829, Dec. 9, 1980, abandoned.

[51] Int. Cl.³ ............................................. B01D 35/06
[52] U.S. Cl. .................................... 210/748; 210/798; 210/243; 210/316
[58] Field of Search .............. 210/748, 798, 806, 108, 210/314, 243, 316–318, 408, 410–412, 484, 494.1, 494.2, 497.01, 505

[56] References Cited

U.S. PATENT DOCUMENTS

| | | | |
|---|---|---|---|
| 2,591,134 | 4/1952 | Canariis | 210/16 |
| 2,890,868 | 6/1959 | Potchen | 259/4 |
| 3,567,619 | 3/1971 | Brown | 210/243 |
| 3,798,879 | 3/1974 | Schmidt-Burbach et al. | 55/102 |
| 3,891,551 | 6/1975 | Tiedemann | 210/82 |
| 3,929,641 | 12/1975 | Dudek | 210/73 |
| 3,933,643 | 1/1976 | Colvin et al. | 210/243 |
| 3,954,621 | 5/1976 | Etani et al. | 210/314 |
| 3,994,810 | 11/1976 | Schaeffer | 210/103 |
| 4,187,179 | 2/1980 | Harms | 210/243 |

*Primary Examiner*—Ivars C. Cintins
*Attorney, Agent, or Firm*—McWilliams, Mann & Zummer

[57] ABSTRACT

An electro-chemical system for liquid filtration for effecting removal of dissolved and suspended solids, undesirable ions, etc, therefrom, and decontaminating same, involving a basic electro-chemical filter device that comprises a canister of cylindrical form that in mounted position is vertically disposed and that defines a bore extending longitudinally of same, with the canister at its upper end being connectable to the source of liquid filrant and being closed off at its lower end. The canister adjacent its lower end is equipped with a cross tube extending therethrough and across the canister bore and having a width that is on the order of seventy-five percent of the width of the canister bore, with the cross tube having a tubular mandrel disposed in same and extending substantially coextensively thereof, and with the portions of the cross tube and mandrel disposed within the canister each being formed to define multiple liquid passing apertures thereabout. Convoluted about the mandrel and in tight fitting relation between the mandrel and cross tube is an elongate composite filter sheeting, of which the sheeting is a pair of foraminous electrically conductive sheets separated by a sheet of fibrous material defining pore spaces approximating one-five microns in size. Disposed in the canister bore between its upper end and the cross tube is a second coarser filter unit of composite disc form disposed crosswise of the canister bore and comprising a pair of foraminous electrically conductive sheets separated by one or more layers of fibrous material defining porous space openings on the order of fifteen-twenty-five microns in size. The foraminous sheets in the two filter units involved are charged anode-cathode fashion by electrical connection to a 12 volt 50 amp D.C power source for polarizing the filter units, continuous recirculating passing of filtrant through the filtration system at a normal 50 psi pressure provides a pure filtrate outflow on the order of 150 gallons per minute with solid size removal efficiency in the range of down to 0.5–5 microns

14 Claims, 10 Drawing Figures

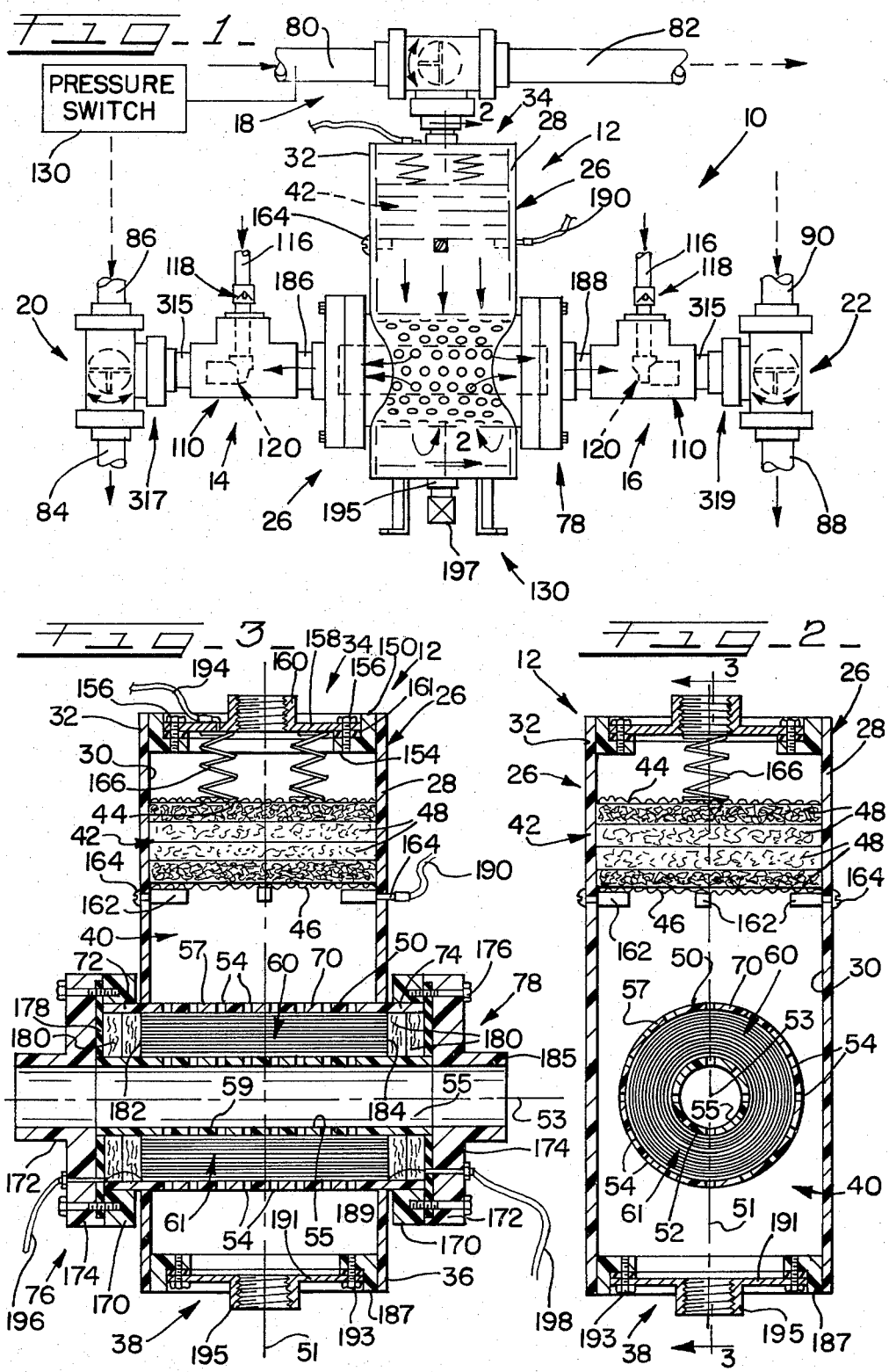

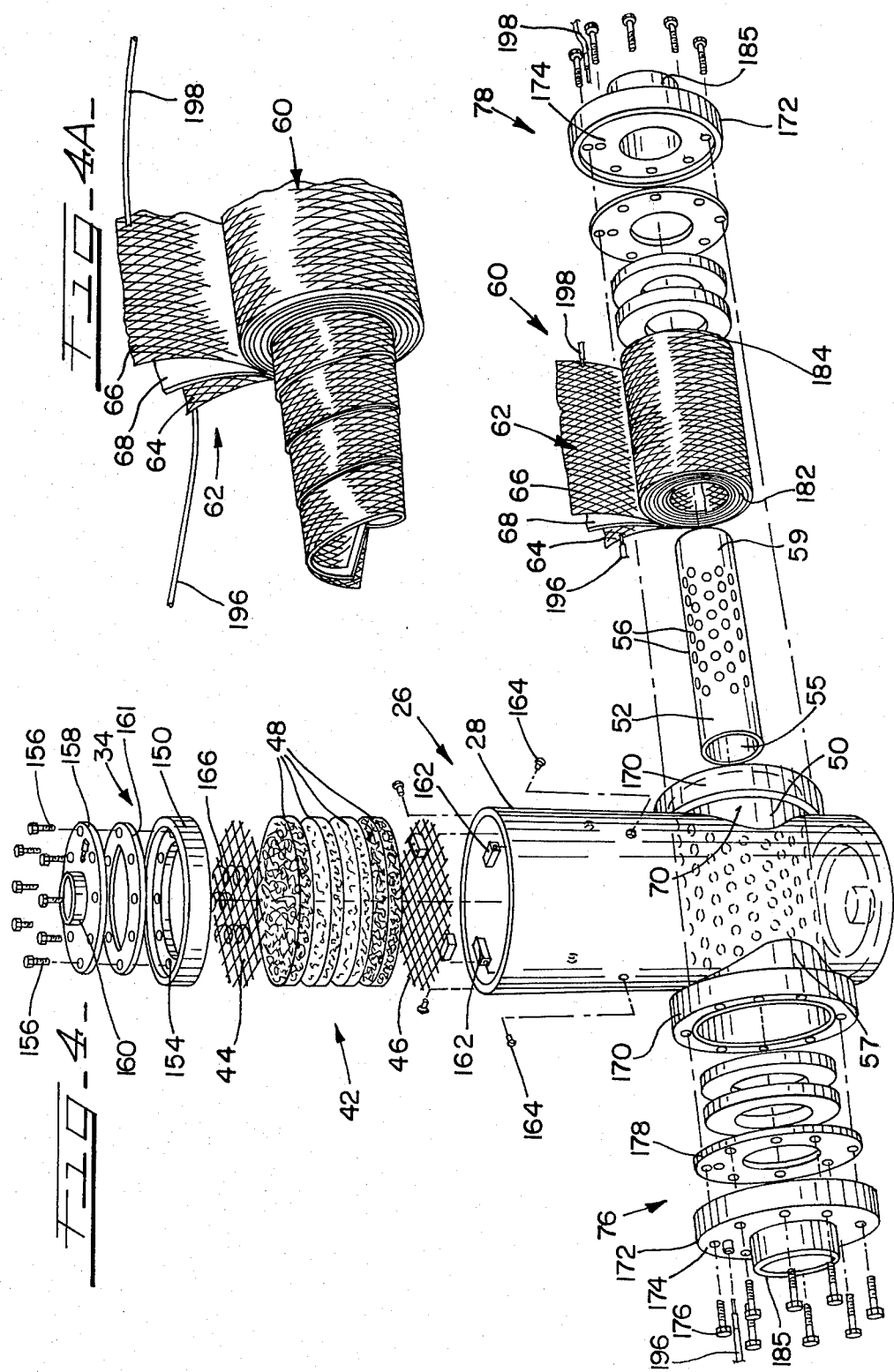

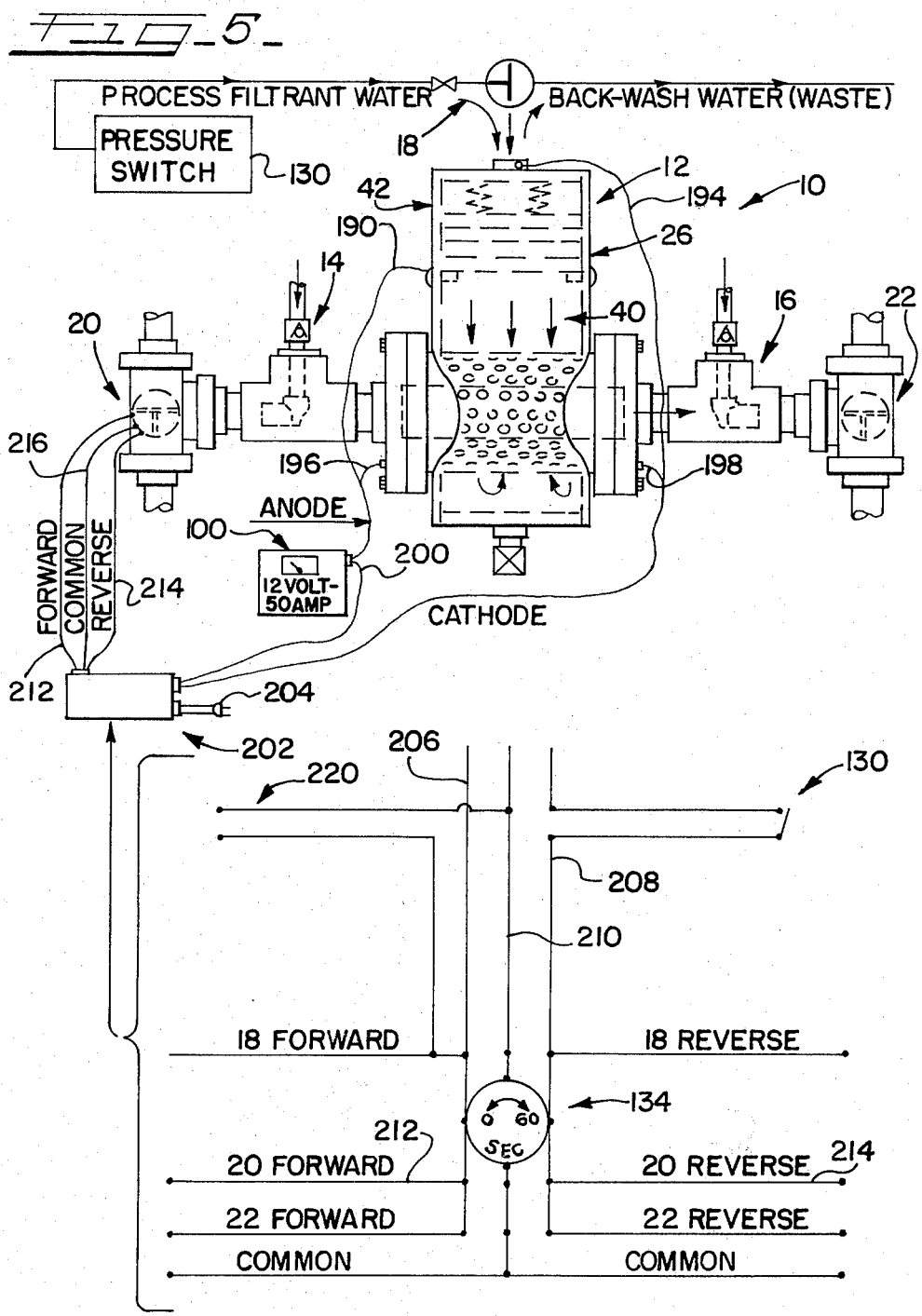

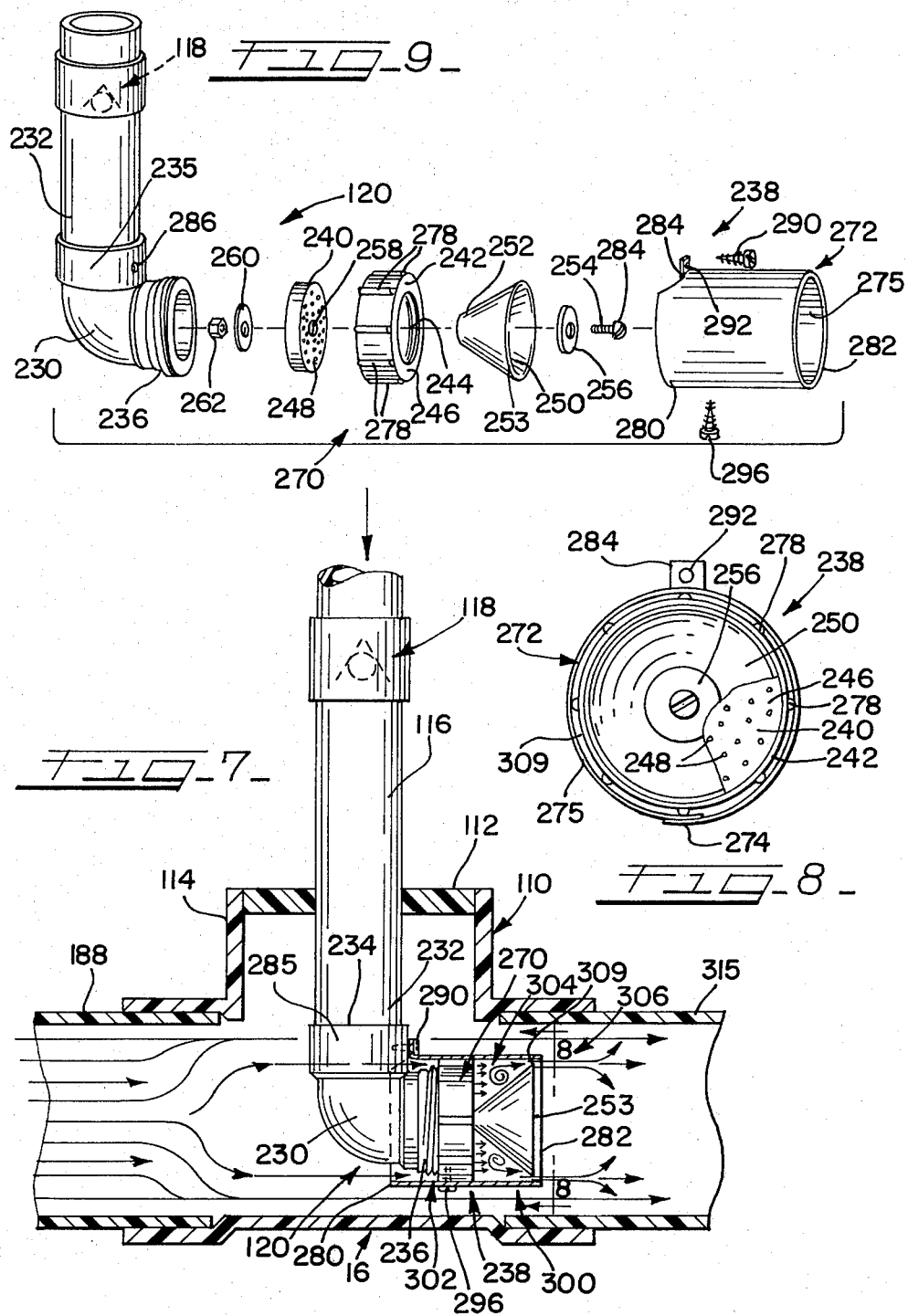

ELECTRO-CHEMICAL SYSTEM FOR LIQUID FILTRATION

This application is a continuation-in-part of my application Ser. No. 213,829, filed Dec. 9, 1980, now abandoned, (the entire disclosure of which is hereby incorporated herein by this reference).

This invention relates to an electro-chemical system of filtering filtration, and more particularly, to a method and apparatus for electro-chemical filtration of water and other liquids for solids removal, decontamination, and general purification purposes.

GENERAL NATURE OF INVENTION

This invention is concerned with an electro-chemical system of filtering water and other liquids, wherein physical properties and/or electrical characteristics are provided by the filter implements involved that, when coupled with the conductive properties of the filtrant to be cleaned or purified, establishes a reliable and controllable liquid electro-chemical filtration and purification action. The invention contemplates that sub-microscopic contaminate dissolved and suspended solids foreign particulate material, undesirable ions, and the like, will be removed from the liquid being treated at a predictable high rate, such as the 1 micro absolute particle size filtration level that is a major objective of the present invention. The invention is basically concerned with providing an economical, compact, light weight, regenerative, high rate filtration system that in practice will effect, for instance, nearly 100 percent removal of toxic organics, scale or waste solids, and biological organism contaminants from, for instance, coolant waters and oils, marine hatchery waters, food processing waters, industrial waste waters, and potable drinking water.

PRIOR ART BACKGROUND

The art of filtration, broadly speaking, is generally represented by various hydro-mechanical or chemically oriented apparatus and procedures whereby impurities are removed from a flow of liquid, usually water. The basic types of filtration arrangements and devices of the prior art, and their accompanying problems and limitations, may be categorized, generally as follows:

1. Non-regeneration modular filters are one time, short use, devices of inexpensive cartridge design that have low flow-high head loss limitations of which the filter material involved is packed cellulose or fibronous textile material that at the optimum best will provide no better than 5-10 micron absolute particle size filtration results. Minor recognizeable suspended solids in the fibrant will quickly clog the filter material within the cartridge and render the filter system involved inoperable. Where moderate and high flow rate is involved, replacement costs and down time are inordinantly burdensome.

2. Regenerative membrane (rotary and stationary types) filters are relatively expensive, and while they may involve filtered water backwash design, they are limited to tertiary or polishing water filtration wherein suspended solids contamination is relatively light and can be removed at the 10-15 part per million level. These filters are generally not efficient in removing solids debris below the 5-10 micron particle size level, and they exhibit low flow filtration characteristics (below 100 gallons per minute) even when effective in the 1-5 micron particle range. Membrane filters foul readily with biological growth inherent to the passing liquid flow, and often become inoperative or highly restrictive to the flow of the filtrant therethrough.

3. Pressurized pre-coated filters are filters of the pressure vessel type that are heavy, bulky, and expensive, and are characterized with costly filtered coatings in the form of diatomaceous earth, fly ash, or the like for filtering and entrapping the suspended solid debris from the passing liquid flow. While precoated filter aids of the type indicated can effectively filter down to the 1 micron particle size level at low filtrant flow rates, at higher, more desirable output flows of 150 gallons per minute (GPM) they tend to become plugged with solids and/or start to dissolve rapidly. As these filter aid precoat materials cannot be regenerated and filter life is short, disposal of contaminated precoat aids presents serious disposal problems that frequently violate the EPA Hazardous Waste definition.

4. High rate sand filtration pressure vessel filters accommodate filtration of relatively large volumes of water (500-1,000 GPM), with reverse filtration water flow along with compressed air providing backwash regeneration of the sand filter material. However, the backwash waste water volume is substantial, as is the cost of the basic system involved. While appropriate selection of sand grain size as filter material will allow volume removal of suspended solid debris down to the 5 micron particle size, this is not adequately close to the micro size level where at least half of the impurities will be found, namely the 1-5 micron particle size, and the dissolved solids particle size range below 1 micron. High rate sand filtration is known to be ineffective for removal of minute particle size debris, and the large volume of backwash water involved in these systems often makes economical disposal impossible.

5. Ion-exchange filters involve filtration systems based on known water chemistry criteria that dissolved contaminating solids are composed of electrically charged molecules and ions. In the filter devices involved, the filter containers are packed with resin material having active site electrical ionic polarity positions therein. A moderate low (200 GPM) ion exchange filter system represents a complex plumbing network involving unwieldy resin filter containers and large installation space requirements. Regeneration of the filter resin becomes complicated and often incomplete due to the plugging of the resin pore spaces by the larger particle size suspended solids of the filtrant. The systems have substantial limitations limiting their practicality for general purpose use because filtration is available for only very select waste waters that must possess very little suspended solids contamination and cannot exceed narrow limits of dissolved chemical contaminants, as well as high cost.

6. Reverse osmosis filters require costly high pressure pumping equipment for moderate outflow apparatus with initial investment, and operating electrical and pressure system maintenance economics that are operationally prohibitive from a practical standpoint. The backwash brine flow required to remove solids from the membrane filter involved periodically causes partial contamination of the filter water flow and reduces the quality of the water filtrate. Reverse osmosis backwash flow volumes often represent 30 to 40 percent of the through-put filtration flow, and therefore the systems provide only a relative low yield of filtered water per unit of capital investment cost, and then only for very select water stream filtration. These systems become inefficient when a multiplicity of contaminating dissolved solids (ions) and suspended particulate contaminants are present that cause membrane fouling.

A principal object of the present invention is to provide a recirculating filtration system for filtering liquids that will effect removal from the filtrant submicroscopic contaminating dissolved solids (in ion form) and suspended particulate solids that may be in the form of foreign matter particulate material that are of either organic or inorganic origin at a predictable particle size approximating 1 micron, while at the same time providing a compact, light weight, regenerative, and economical apparatus or device for that purpose.

Another princial object of the invention is to provide a method and apparatus of electro-chemical filtration of liquids in which basically the same filtration apparatus or device may be employed for both oils and waters, and in which the practice of the invention provides removal of toxic organics, scale and water solids, biological organism contaminants and other foreign matter from the liquid, with efficiencies approaching 100 percent.

Another principal object of the invention is to provide an electro-chemical filtration system that is oriented toward taking advantage of the conductive properties of the liquids to be filtered, such as natural particle debris is water, that effects undesirable ion and colloidal particle removal by way of coagulation, agglomeration, or flocculation of same into larger particle size for entrapment in a two stage polarized filter medium, with efficient regeneration of the filter units involved being provided for by way of backwash procedures that may be built into the system for automatic operation.

Another important object of the invention is to provide an electro-chemical system of filtration, and specifically methods and devices or apparatus arranged in accordance with said system, that is economical of manufacture, compact, light in weight, uncomplicated, and safe in design, that is adaptable for application to a wide variety of liquid filtration needs and requirements, and that is long lived, efficient, and easy to use in operation.

In accordance with the invention, a basic electrochemical liquid filtration device is provided comprising a canister in cylindrical form that has a bore extending longitudinally thereof and in use is adapted to be vertically position oriented when installed for operating purposes. The canister at its upper end is adapted for connection to the source of the liquid filtrant, and the lower end of the canister is closed to seal same off but provide for periodic removal of foreign materials collecting at the lower end of the canister. The canister adjacent its lower end has a cross tube extending crosswise through same and fixed to same that has a width that is less than the width of the bore on the order of 25 percent, with the cross tube being centered on the longitudinal axis of the canister and having its external surfacing in sealed relation thereabout with the canister at either end of the cross tube. Centered within the cross tube is a tubular mandrel that extends substantially coextensive with the cross tube, with the portions of the cross tube and mandrel that are disposed within the canister each being formed to define multiple liquid passing apertures or orifices thereabout, with the aperture or orifice area total of the cross tube apertures being greater than the corresponding total area of the mandrel tube total orifice or aperture areas by about 25 percent. Interposed between the cross tube and the mandrel is an elongate composite filter sheeting tightly convoluted about the mandrel and in close fitting relation in the space between the mandrel and the cross tube, with the convoluted composite filter sheeting comprising a pair of foraminous electrically conductive corrosion free sheets that each may be in the form of stainless steel wire mesh, separated by a sheet of fibrous material of such fiber size (diameter and density) that the pore spaces or interstices defined thereby have a size in the range of from about 1 to about 5 microns.

A second, coarser filter unit is disposed across the bore of the canister and located between the upper end of same and the cross tube, and is in the form of a pair of foraminous, electrically conductive, non-corrosive sheets, that may be stainless steel or mesh, separated by layers of fibrous material that may comprise one or more discs of fibers of a suitable diameter and density to provide pore spaces therein that have a size in the range of from approximately 15 to approximately 25 microns as average open space.

In each of these filter units of the canister, the filter units are polarized by connecting the respective sets of foraminous sheets anode-cathode fashion to a low voltage low amp source of direct current, such as a 12 volt 50 amp D.C. power supply system.

The general arrangement involved is arranged to interact with the electrical properties of dispersed ion and solid particulate material, whether dissolved or suspended, that might be considered contaminate or otherwise undesirable matter, with filtration removal being accomplished by the passage of the filtrant through the polarized filter units, with the upstream filter unit being of a relatively coarse fiber type to filter out the larger solid particles, and the downstream cross filter unit comprising a relatively fine fiber filter for minute solids and ion removal. Within the two filter units, under the polarization of same that is involved, the solids effect a precoating of the fibers by physical attraction thereto, with the solids becoming electrically charged and attracting other charged solids thereto for coagulation, coalescing and agglomerating of same into larger particle size within the two filter units. The solids tend to form linear molecular chain clusters that become entrapped within the fibrous material involved, with ions being electrically held by the polarization involved within the filter units.

In the general arrangement involved, the filter system canister has its cross tube filter unit arranged for filtrate discharge at either end of same through the mandrel bore, under the control of two three way off-on valves one at either end of the cross tube filter unit, with the entry of the filtrant into the canister being similarly controlled by a similar three way off-on valve. Pursuant to the basic system involved, these three valves are simultaneously controlled for full filtration flow in one position, and for backwash, filter unit regeneration, flow through the canister, in an opposite position, preferably arranged for automatic operation when the psi of the filtrant entering the canister exceeds a predetermined amount, with automatic return to full filtrant flow position after a predetermined time of backwash operation.

The basic recirculating filter system provides for, in conjunction with the discharge of the filtrate from the cross tube filter unit, the injection of ambient air and/or oxidizing gases that for filtration flow purposes may provide for additional oxidation-coagulation of contaminant dissolved solids or other treatment of the effluent, and for backwash purposes provide for gas or air scrubbing of the filtration units as part of the procedure of regenerating same.

Also disclosed is a special gas or air injector device specifically adapted for use in connection with the filtration device or apparatus of this system, that provides dispersed solution gas required for backwashing or for coagulating solids into larger filtrable particle size.

Other objects, uses, and advantages will be obvious or become apparent from a consideration of the following detailed description in conjunction with the application drawings, in which like reference numerals are employed to indicate like parts throughout the several views.

In the drawings:

FIG. 1 is a diagrammatic side elevational view of a electro-chemical filter module arranged in accordance with the present invention, as adapted for incorporation as a unit in a typical engineering industrial system, such as that diagrammatically illustrated in FIG. 6;

FIG. 2 is a vertical sectional view through the filter assembly itself, taken substantially along lines 2—2 of FIG. 1, but on an enlarged scale;

FIG. 3 is a vertical sectional view through the filter assembly, taken substantially along line 3—3 of FIG. 2;

FIG. 4 is an exploded perspective view diagrammatically illustrating the components of the filter assembly of this invention;

FIG. 4A is a fragmental perspective view diagrammatically illustrating the convoluted arrangement of the composite filter sheeting forming a part of the fine filter unit at the cross tube portion of the filter assembly of FIGS. 1-4;

FIG. 5 is a diagrammatic and partially schematic view illustrating the electro-chemical filter module of FIG. 1 and associated electrical circuitry for operating the module in accordance with the present invention;

FIG. 7 is a view taken along section line 3—3 of FIG. 2, but illustrating on an enlarged scale the gas injector device shown to the right of the filter assembly of FIGS. 1 and 5, with parts being shown in elevation and the liquid flow being illustrated diagrammatically to bring out the special nature of the injector device;

FIG. 8 is an elevation view of the discharge end of the injector, taken substantially along line 8—8 of FIG. 7; and FIG. 9 is an exploded perspective view illustrating the basic components of the injector.

Figure 6:
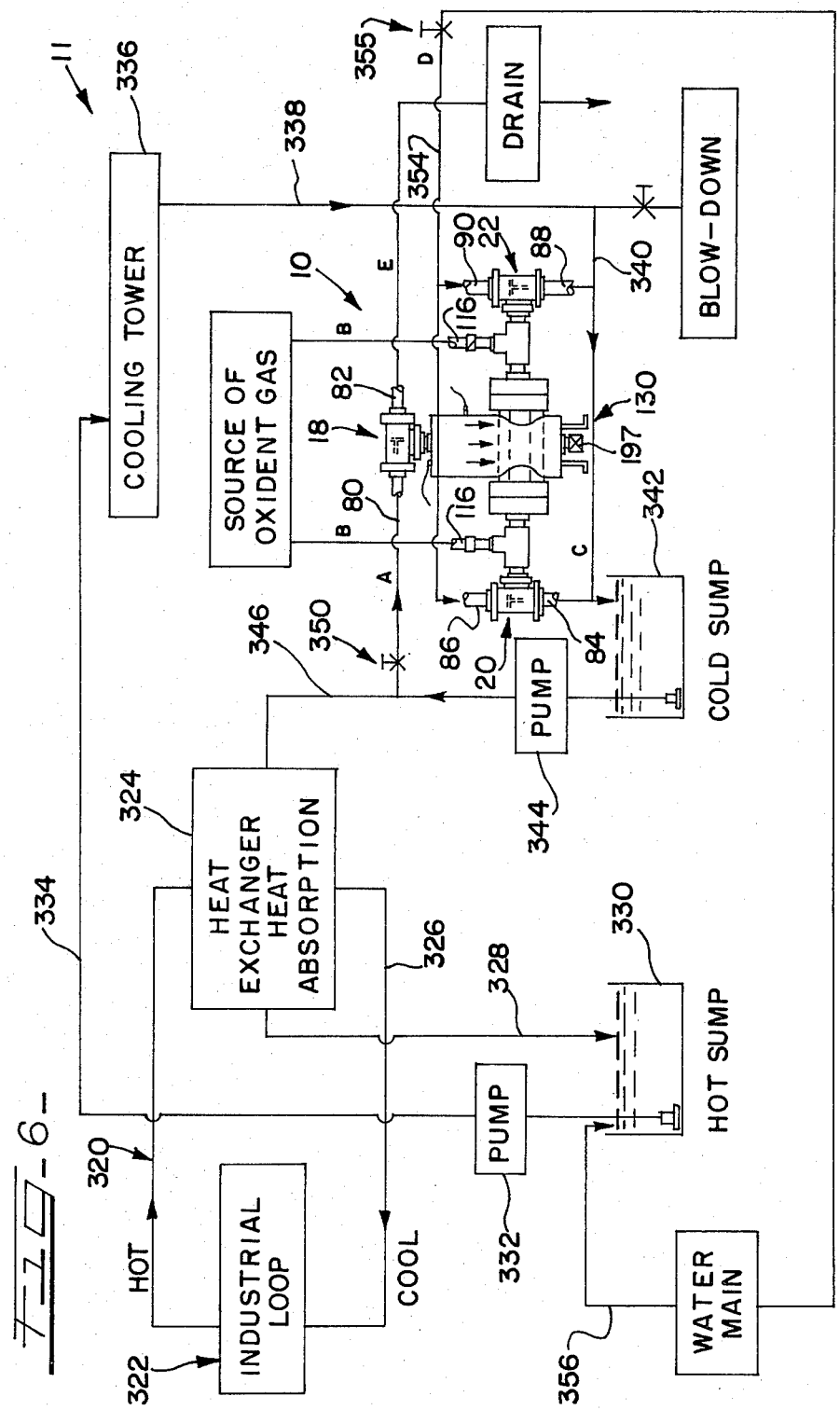
FIG. 6 is a diagram illustrating the layout of a typical engineering industrial water handling system in which the filter module of this invention may be incorporated.

However, it is to be distinctly understood that the specific drawing illustrations provided have been supplied primarily to comply with the requirements of the Patent Laws, and that the invention is susceptible of modifications and variations that will be obvious to those skilled in the art, and that are intended to be covered by the appended claims.

GENERAL DESCRIPTION

Reference numeral 10 of FIGS. 1 and 5 generally indicates electro-chemical filter module arranged in accordance with the present invention for application to typical industrial or commercial water system arrangements for decontaminating and purifying the water, such as the system 11 diagrammatically illustrated in FIG. 6.

The electro-chemical filter module 10 comprises filter assembly 12, a pair of gas injector assemblies 14 and 16 disposed on either side of the filter assembly 12, and three three way valve assemblies 18, 20 and 22 that are disposed at the three inflow and outflow sites of the module 10 for liquid directional flow control purposes.

The liquid directional flow control valves 18, 20 and 22 are arranged in the manner diagrammatically illustrated in FIG. 5 for simultaneous actuation between coordinated positions whereby the filtrant is passed through the module 10, resulting in an effluent filtrate having the quality contemplated by this invention, and a second set of coordinated oppositely disposed positions in which the module 10 is set for backwash liquid flow purposes for regenerating the filter assembly 12.

The filter assembly 12 is illustrated in detail in FIGS. 2-4A, and comprises a canister 26 in the form of cylinder 28 defining cylindrical bore 30. The canister 26 when in its operative position is vertically disposed and has its upper end 32 provided with fitting device 34 for connecting same to the source of the liquid to be filtered as well as to serve as the point of discharge from the assembly 12 of backwash water. The canister 12 at its lower end 36 is provided with a suitable end closure device 38, that is to be equipped for sealing off this end of the canister during use and periodic clean out of the canister end 36.

The canister bore 30 defines a liquid flow chamber 40 having mounted adjacent the upper end of same a coarse filter unit 42 that in the form shown comprises a pair of spaced apart foraminous grids 44 and 46, that are preferably formed from stainless steel wire screening, which have disposed therebetween one or more discs 48, that are preferably formed from resiliently compressible fibrous sheeting material, such as polyester or nylon fibers, which are sized and compacted or densified to provide pore space or interstice open areas within the pad like discs that have a size in the range of from about 15 to about 25 microns, on the average.

The canister 26, spaced below the coarse filter unit 42, has cross tube 50 extending thereacross and therethrough. Cross tube 50 extends perpendicularly of the central axis 51 of cylinder 28 and is centered with respect to same such that its own central axis 53 intersects the cylinder longitudinal axis 51 as indicated in FIG. 2. It is a feature of the invention that the external diameter of the cross tube 50 is approximately 25 percent less than the internal diameter of the bore 30, so that the chamber 40 has a 360 degree relationship with the portion of the cross tube 50 that is disposed within bore 30, with unimpeded flow passage space between the cylinder and the cross tube side wall 57, as shown in FIG. 2.

Centered within cross tube 50 is tubular mandrel 52 defined by circumambient side wall 59 defining bore 55. As shown in FIGS. 2, 3 and 4, the portions of the cross tube 50 and the mandrel 52 disposed with canister 36 are each formed with multiple liquid passing apertures or orifices thereabout, those of the cross tube 50 being indicated by reference numeral 54, while those of the mandrel 52 being indicated by reference numeral 56. The liquid passing apertures 54 and 56 are formed in rows along the respective members 50 and 52, and specifically, their side walls 57 and 59, with alternate rows being offset, as indicated in FIG. 4. A feature of the invention is that the orifices or apertures 54 define an overall orifice area for the cross tube 50 is approximately 25 percent greater than the composite or total orifice area defined by the orifices 56 of the mandrel 52.

Interposed between the cross tube 50 and the mandrel 52 is fine filter unit 60 that is diagrammatically illustrated in FIGS. 2-4A, which comprises in accordance with the invention an elongate composite filter sheeting 62 tightly convoluted about the mandrel 52 and being in close fitting relation between the mandrel 52 and the cross tube 50 in the assembled relation of same, as indicated by FIGS. 2 and 3. The sheeting 62 in accordance with the invention comprises a pair of foraminous electrically conductive sheets 64 and 66 that may be in the form of stainless steel wire screening, which have interposed or sandwiched therebetween resiliently compressible fibrous sheet 68 that is preferably formed from a suitable fibrous material, such as nylon or polyester and densified or compressed to define pore or interstice open space areas that average in the range of from about 1 to about 5 microns in size. Iron oxide basault rock wool or iron oxide slag wool fibers of the type normally used for insulation are also appropriate for specific applications, as will be disclosed hereinafter.

The cross tube 50 comprises cylinder member 70 in which the apertures 54 are formed, and which has opposite end portions 72 and 74 (see FIG. 3) projecting exteriorily of the canister 26, with the joint between the cylinders 28 and 70 at the position of the cross member 50 being suitably sealed by employing suitable bonding or sealing material. The ends 72 and 74 of cross tube 50 have applied to same suitable fitting devices 76 and 78, respectively, for application thereto of the respective injector assemblies 14 and 16, which in turn have applied to same the respective valve devices 20 and 22. The end fitting 34 of the canister 26 is operably connected to the valve device 18. As indicated in FIG. 1, the valve device 18 has connected to one end of same filtrant inflow pipe or conduit 80, and at the opposed end of same backwash outflow pipe or conduit 82. The valve device 20 has connected to one end of same filtrate outflow pipe or conduit 84 and backwash inflow pipe or conduit 86 is suitably connected to the opposite end of same. Likewise, the valve device 22 has filtrate outflow pipe or conduit 88 suitably connected to one end of same, and at the opposite end of same backwash inflow pipe or conduit 90 is suitably connected thereto.

The three way valves 18, 20 and 22 in and of themselves and as associated with the conduiting indicated are conventional three way directional flow valves, with such valves, when in their positions of FIG. 1 (as indicated by the three way valve indicating symbols employed), accommodating flow of the filtrant into the module 10 via pipe or conduit 80, and outflow from the module 10 via the piping or conduits 84 and 88. When the positions of the valves 18, 20 and 22 are reversed in accordance with the invention, filtrant flow into the module 10 ceases, as does filtrate flow therefrom, and instead backwash flow enters the module 10 at piping or conduits 86 and 90 and leaves the module via piping or conduit 82.

Further in accordance with the invention, the grids or sheets 44 and 46 of filter unit 42 are electrically connected to a suitable source of direct current energy anode-cathode fashion for polarizing the unit 42, and the foraminous sheets 64 and 66 are similarly electrically connected to a suitable source of direct current energy anode-cathode fashion to polarize the filter unit 60. For this purpose the anode of filter unit 42, for instance, grid 44, and the anode of filter unit 60, for instance, sheet 64, are connected in parallel to, for instance, a conventional 12 volt 50 amp source of direct current power, which source is indicated in diagrammatic FIG. 5 by reference numeral 100, while the grid 46 of filter unit 42 and the sheet 66 of the filter unit 60 are connected in parallel cathode fashion to the same source in any suitable manner, such as that diagrammatically illustrated in FIG. 5. The direct current source 100 preferably provides D.C. voltage in the range of from about 12 to about 24 volts at an amperage in the range of from about five to about fifty amps.

In the module 10, the canister forming cylinder 26, cross tube 50, and mandrel 52 are formed from suitable inert materials, such as polyvinyl chloride tubing. In a successful embodiment of the invention providing a filtrate outflow of 150 gallons per minute with the conventional filtration pressure of 50 psi at the filtrant intake end of canister 12, the cylinder 28 forming canister 26 is 12 inch diameter polyvinyl piping while the cross tube 50 is 8 inch diameter polyvinyl piping and mandrel 52 is 3 inch diameter polyvinyl piping; the piping preferably is of the Schedule 80C (high temperature) polyvinyl commercial plastic piping. The grids or sheets 44 and 46 of the filter unit 42 and the grids or sheets 64 and 66 filter unit 60 are formed from stainless steel wire screening with grids 44 and 46 having a mesh of 8, and grids or sheets 64 and 66 having a mesh of 40. It is intended that all parts disposed internally of the canister 12 and module 10 be formed from noncorrosive or inert materials.

Referring to FIG. 7, the gas injector assemblies 14 and 16 each comprise suitable three way fitting 110 that may be formed from the indicated polyvinyl chloride material that is joined at its opposite ends to the respective connecting fittings involved in any suitable manner. Closure disc 112 is fixed across the fitting upper end 114 in any suitable manner and mounts in upright position standpipe 116 that has applied to same a suitable conventional check valve 118 that may be one of the common ball types. Mounted on the lower end of the standpipe 116 is gas injector device 120 that will be described in detail hereinafter, and which receives from under pressure a suitable source air or other oxidizing and/or solids coagulation inducting gas for injection into the moving stream passing through the fitting 110, with the gas involved depending on the application to which the module 10 is being put. The injector device 14 is the same as injector device 16, as indicated by corresponding reference numerals. The check valves 118 prohibit backflow into the piping or conduiting 116 of the filtrate being treated by the injector devices 14 and 16. The gas should be supplied to devices 120 at a psi pressure which exceeds by approximately 25 psi the psi pressure of the filtrant at the intake end of canister 26.

In operation, assuming that the module 10 is operably connected to liquid flow piping or conduiting for liquid directional flow purposes in the manner diagrammatically illustrated in FIGS. 1 and 5, with a module 10 resting on suitable support framework 130, and assuming that the filter units 42 and 60 have been polarized by electrical connection, in anode-cathode fashion, of the electrically conductive screening components involved in each filter unit in the manner suggested, the valve devices 18, 20 and 22 when positioned as indicated in FIG. 1 accommodate filtrant flow through the module 10 in the direction indicated by the full line arrows to effect the filtration and water purification objectives of this invention insofar as the filtrate emerging from same is concerned.

A basic feature of the present invention is that the filtrate insofar as the two filter units are concerned is to pass through polarized, fibrous material equipped, filter units, with the arrangement being devised to take advantage of the conductive properties that are inherent in liquids that have contaminants and the like to be removed. These materials may be in ion form if dissolved, and are thus inherently electrically charged, or in colloidal form, as well as perhaps comprising solids of the toxic organic, scale and waste, and biological organism types, all of which have been found to be responsive to electrically polarized environment.

Both the filter units 42 and 60 effect filtration on similar principles, in accordance with the invention, which contemplates that as the filtrant initially passes through the respective units, the fibers of the fibrous components of same become precoated with the filtrant solids due to the natural physical attraction of such solids to the fibers, and the charging or polarization of the respective filter units effects a charging of the fiber solid coatings which attracts thereto further solids and ions that are passing into the respective filter units.

The solids involved as filtration proceeds, have been found to continuously orient electrical charge fashion, coagulate, coalesce and agglomanate into larger filtrant particle size, by way of becoming positive-negative linear molecular chain clusters, whereby their enlarged particle size physically entraps them within fibrous sheeting of the respective polarized filter units, with the charging of such units also electrically holding such solids and ionic matter within the respective filter units. Further, the peripheral electrical charge that is naturally involved in each suspended solid particle seems to tend to prevent the return of such solids back into the passing liquid flow, as the charge of the respective anode and cathode components with respect to the filter units seems to condition these particles for capture by electrical attraction to form the larger size particles involved.

With regard to the canister 12, as the filtrant enters the canister 12, it meets and enters filter unit 42, with the liquid flow involved completing the circuit between the grids 44 and 46, whereby the dissolved impurities in the form of ions are responsive to the charging involved to cause the ions to adhere to the positive or negative grid 44 or 46, as the case may be, and the solids to build up within the pores or interstices defined by the fibrous material involved. Filter unit 42 functions to remove from the filtrant the larger particle materials therein which as a matter of practice would have a size in the range of from about 1 micron to about 5 and larger, including bacteria.

The filtrant leaving the filter unit 42 moves downwardly and then is applied about the cross tube 50 in 360 degree relation thereabout for entry through cross tube aperatures 54, passing through the convoluted and thus multiple layers of the filter unit 62, and thence through the apertures 56 of mandrel 52, into its bore 55.

During the passage of the filtrant through the filter unit 60, the aforementioned charging and positive-negative orientation of the particles takes place with the resulting coagulation, coaescence, and agglomeration into the indicated positive to negative linear molecular chain clusters whereby they become physically and electrically entrapped within the filter unit. The filter unit 60 is arranged to take out particle sizes down to 0.5 to 1 micron size range. Unit 60 in acting in accordance with the invention electrically coagulates, coalesces, and agglomerates particles of submicron size where they are dissolved or in the colloidal state, and even undesirable materials in solution ion form, into an aggregate of adhered multiple particle-ion combinations that agglomerate into a larger particle size forming a multiple particle-ion structural matrix throughout the filter unit 60 and about the filter chamber 61 defined by cross tube 5 and the mandrel 54. The resulting matrix that has electrically developed by agglomeration or flocculation within the pore spaces or interstices of the filter 62 permits the resulting filtrate to be the result of substantially 100 percent removal of the various toxic organics, scale and waste solids, biological organism contaminants, and the like that will be encountered by water to be filter treated. Similar results are achieved filtering oils.

In the area of the injection assemblies 14 and 16, the injection devices 120 provide for in-line pressurized dispersement of gases into the filtrate for treating purposes, such as the injection of ozone or singlet molecular oxygen for disinfectant and coagulation purposes.

Further in accordance with the invention, the module 10 is arranged for backwash purposes when the pressure of the filtrant at the intake end of the canister 12 exceeds a predetermined amount, such as 75 psi where the conventional 50 psi filtrant flow pressure is employed. For this purposes, a suitable pressure switch 130 of any conventional make is employed in communication with the conduit 80 or head end of the canister 12 to effect electrically reversal of the positioning of the valve devices 18, 20 and 22 to the positions already indicated, whereby the flow of the filtrant through the module 10 ceases, and instead backwash liquid, such as city main water, is passed therethrough in a reverse flow pattern with entry at the conduits 86 and 90, passage through the injector assemblies 14 and 16, and entry into the mandrel 52 for passage through the filter unit 60 into filter chamber 40 and through filter unit 42 for discharge via conduit 82 into a suitable waste drain, or sump where recovery of some of the removed materials is desired. It is preferable that the backwash functioning of the apparatus be automatic during operation of the module 10, for instance, for a specific selected time of backwash that may be up to three minutes. A one minute backwash cycle is contemplated for the embodiment illustrated once the switch 130 brings this operation of the module 10 into play, by way of the diagrammatically illustrated circuitry 132 of FIG. 5, whereby the circuitry 132 incorporates a conventional double pole double throw 60 second self reversing 115 volt 15 amp timer indicated at 134. However, manual actuation of the means to switch valves 18, 20 and 22 to their backwash modes may optionally be employed.

While the module 10 is in its backwash mode, the reverse liquid flow through the filter assembly 12 washes the solid particle-ion structural matrix that has been built up, from the respective filter units. The gas injection of the injector assemblies 14 and 16 continues to operate whereby the injected gas, for instance ozone or ambient air, and backwash water effect a vigorous agitation type scouring action on the fibrous filter materials, in passing through the respective filter units in a reverse flow direction, effecting full release of the entrapped solids. It has been found that the gas injected by the injector devices 120, which may be partially or wholly dissolved in the backwash water, provides on entry into the filter units an increased pressure, saturated gas scouring vibration-agitation action within both filter units 42 and 62. The dissolved gas involved seems to provide a hydraulic pulsation which expands the fiber materials of the respective filter units and this agitation of the filter material involved is caused by and results in the breaking away and washing therefrom of the contaminant solids and the like that are entrapped therein, to the backwash drain off flow.

It is preferred that the backwash liquid supplied to the module 10 be at a pressure that exceeds that of the normal 50 psi filtrant supply pressure to the module 10; approximately 75 psi is preferred, assuming the normal 50 psi filtrant supply pressure, with the backwash pressure being roughly in the same proportion greater when other filtrant supply pressures are employed. The gas supplied to injector devices 120 should be under pressure of approximately 25 psi above the filtrant supply pressure, as already indicated. As the backwash liquid enters and passes through consecutively the respective filter units 60 and 64, reduced pressures are encountered whereby the gases carried by the liquid, whether in dissolved relation or not tend to be released in an effervescent manner; further, as the backwash liquid and gas act on the resiliently compressible fibrous materials involved in each filter unit, the solid in breaking away in a random piece by piece manner are immediately displaced by the liquid, causing a hydraulic jolting or hammering action that pulsates as the replacement of the solids proceeds. This overall action seems to be responsible for the air scouring, vibration, and agitation action that is provided on the filter mediums on both filter units 62 and 42, with the fibrous layers of same expending under the reduced pressures and the effervescing gas pressure they experience. After a predetermined time of backwash, the module is retured to its filtering mode. This operation of the mode may be effected electrically either manually or automatically, with the circuitry 132 being arranged for automatic switch back by way of timer device 134.

SPECIFIC DESCRIPTION

Referring back to FIGS. 1-4A, the fitting device 34 of canister 26 comprises collar 150 that may be formed of the same polyvinly chloride material as canister 26 which is bonded to canister 26 in leak free relation thereto by employing a suitable standard plumbers bonding solvent for that purpose. Collar 150 defines annular flange 155 on which is threadedly mounted, as by employing suitable stainless steel screws 156, stainless steel fitting plate 158 that is formed with a suitable internally threaded hub 160 for appropriate connection to the conduiting of the valve mechanism 18, with suitable elastomeric seal 161 being interposed between plate 158 and flange 154.

Filter unit 42 rests on four stainless steel studs 162 spaced 90 degrees apart about the circumference of the canister 26 and held in place by suitable stainless steel screws 164. Interposed between the fitting plate 158 and the upper grid sheet 44 are a plurality of compression springs 166, which in the form shown are formed from stainless steel wire ⅛th of an inch in diameter and are shaped to have coils that are approximately 2 inches in diameter. Springs 166 bias the filter unit 42 against the studs 162, and hold the unit 42 components together against that action of fackwasy flow.

The discs or layers 48 making up the fibrous components of the filter unit 42 may be of several different fibrous makeups. One recommended composition of the discs is polyester fibers of 100 denier diameter compressed to a density of 60 ounces per square yard or alternately 25 denier diameter fibers at 12 ounces per square yard.

A further alternate filbrous material is 15 denier polyesther fibers at 14 ounces per square yard. Another satisfactory fibrous material is a 50—50 combination of nylon and polyester fibers of 6.5 denier diameter and a density of 8 ounces per square yard.

Where it is desired to enhance the polarized characteristics of the filter unit, one or more of the fibrous discs may be formed from and 8 a percent iron ozide slag wool having a density of 16 pounds per cubic foot, which may be of the commercially available type slag wool glassified insulation material that is commercially available from 48 Insulation Company of North Aurora, Ill.

The disc 48 may be in the form of pads of the materials indicated that are one-quarter inch in thickness.

The end fitting devices 76 and 78 for the cross tube 50 are identical in construction, and each comprises a collar 170 from the aforementioned polyvinyl chloride plastic material and bonded to the cross tube 50, as by using the aforementioned standard plumber solvent bonding material. Affixed to the respective collars 170 are fitting plates 172 likewise formed from the same polyvinyl chloride plastic material that are flanged as at 174 to receive suitable securement bolts 176 that are suitably threaded into the respective collar 170 to make fitting plates 172 fast thereagainst and against suitable elastomeric sealing discs 178 that are compressed thereagainst as well as several sealing fibrous discs 180, formed from polyester fibers or the like, that are interposed therebetween at the respective ends 182 and 184 of the filter unit 60. Fitting plates 172 define suitable hub portions 185 that are adapted for fixed connection to the respective polyvinyl chloride conduit sections 186 and 188 that connect the bore 55 of mandrel 50 with the respective injector fittings 110, with these parts being bonded together as by employing the indicated standard plumbers polyvinyl chloride solvent for cementing purposes in the usual leak free relation.

Valve 197 may be of the ball valve type, and when closed, effects closing off of canister 26. It is provided to permit occasional removal of solids, as needed, from canister 26. The canister end closure device 30 comprises a collar 187 similar to collar 150 and similarly bonded to cylinder 28 and formed with flange 189 to which stainless steel fitting plate 191 is secured by stainless steel screws 193. Plate 191 defines internally threaded hub 195 to which suitable normally closed drain valve 197 is suitably applied to close canister 26.

As indicated in FIG. 5, for the filter unit 42 the anode lead 190 is connected to the lower grid disc or sheet 46 by way of connection to one of the supporting screws 164. The cathode connector lead 194 is electrically connected to fitting plate 158 with springs 166 being in electrical conducting relation between the plate 158 and the upper grid sheet or disc 44.

As to the filter unit 60, the anode connector 190 includes branch 196 suitably connected to the electrically conductive foraminous sheets 64, as through fitting plate 172, while the cathode connector includes connector branch 198 suitably connected to foraminous sheet 66, as through the other fitting plate 172 and associated parts, as diagrammatically illustrated in FIGS. 3, 4A and 5. The anode connector 190 in the diagrammatic illustration of FIG. 5 leads to the indicated conventional and preferred 12 volt 50 amp source of D.C. power supply for module 10, which has lead 200 extending from same to suitable conventional automatic backwash control device 202 that is diagrammatically illustrated in terms of circuitry in FIG. 5, in which the usual outlet plug 204 fits into a socket supplying the familiar 115 volt alternating current power source, with the plug 204 being suitably connected to supply lines 206 and 208 and neutral or common line 210, the pressure switch having a suitable switch arm and contacts for breaking line 208 as indicated in the circuit portion of FIG. 5.

The fibrous layer 68 of sheeting 62 may be a sheeting of 15 denier nylon fibers compressed to a density of 7.5 ounces per square yard; alternates are a 50—50 percent combination nylon-polyester fiber sheeting of 3.75 denier nylon fibers and 5 denier polyester fibers at a density of 6 ounces per square yard, and where polarity enhancement is desired one percent iron oxide basault rock wool filter material having a density of four pounds per cubic foot, or two percent iron oxide slag wool having a density of four pounds per cubic foot, both the latter being commercial insulation material available from 48 Insulation Company, of North Aurora, Ill.

The polyester fiber and nylon fiber materials herein referred to are commercially available from Moldan Filbration Corporation of North Carolina.

The sheeting 68 and pads 48 are preferably about one-quarter inch in thickness.

The valve devices 18, 20 and 22 are identical in construction and comprise self reversing gear driven motor actuated valve positioning devices that are commercially available from, for instance, Asahi/America, of Medford, Massachusetts, with each such device having the three connections indicated for the valve device 20 as illustrated in FIG. 5, with connectors 212, 214, and 216 extending from the device 202 to the appropriate locations of the valve device 20 for forward and reverse movement of same. The valve devices 18 and 22 are similarly arranged and connected in parallel to the power supply device 202, which is also arranged to electrically interrupt the cathode leads by connection to the power source 100 where indicated at 220, when the timer 134 reverses to the backwash position so that the filter units of assembly 12 are depolarized during backwash. Valve units 18 and 22, as indicated, are similarly arranged and are connected in parallel for simultaneous operation in the same manner as illustrated for valve device 20. In the normal operating position for filtering, devices 18, 20 and 22 are positioned as shown in FIGS. 1 and 5 and pressure switch 130 is closed; switch 130 may be of the type represented by the Penn-Baso pressure switch (Model P 61AG-1) offerred by Johnson Controls Corp., Control Products Div. of Oakbrook, Ill. When the pressure switch 130 is opened by the indicated pressure increase level at the intake end of the module 10, timer 134 reverses (by way of its conventional arrangement) to turn the valve device 18, 20 and 22 into their reverse flow modes, with the circuit of the cathode being interrupted where indicated at 220. Timer 134, which may be of any conventional automatically operating type, such as the Agastat self reversing timer, Model No. 7024 AE, available from Amerace Corp., Control Products Div., Union, N.J., again reverses, after being disposed in its backwash cycle position, 60 seconds for the illustrated embodiment, to return the valve devices 18, 20 and 22 to their normal filtering modes and closing the cathode circuit for filter devices 42 and 62.

THE GAS INJECTOR DEVICE

Referring now to FIGS. 7, 8 and 9, the device 120 comprises elbow pipe element 230 suitably fixed to the depending end 232 of the standpipe 116, as by both of these components being formed from the aforeindicated polyvinyl chloride piping and bonded together at connection 234 in leak free relation, as by employing the aforementioned standard plumbers bonding solvent to bond pipe end 232 to elbow collar 235. Elbow 230 is formed to define threaded end portion 236 to which is applied the injector device mixer head assembly 238, the component parts of which are best diagrammatically illustrated in FIG. 9. Thus, the mixer head assembly 238 comprises defuser disc 240 that is 240 that is seated within collar 242 that is internally threaded as at 244 and formed with abutment flange 246 against which the defuser disc is seated, the defuser disc 240 being bonded in place against the flange 246 of collar 242. The defuser disc is formed with a plurality of apertures or orifices 248 for passage of the gas or air supply to the device 120 therethrough; as indicated in FIGS. 8 and 9, the apertures or orifices 248 are evenly distributed across the diameter of disc 240 and may be 1/32nd inch in diameter for gas or air feed therethrough, it being desired that they be equally spaced. Defuser cone 250, which is formed from the stainless steel and is actually frustoconical in configuration, has its narrow end 252 anchored to defuser disc 240 on its discharge side by screw 254 extending through washer 256, the end 252 of the defuser cone, the central opening 258 of the defuser disc, and washer 260, for threaded engagement with nut 262, with the nut 262 being turned onto the screw 254 to bring its head 264 against the washer 256 to firmly seat the latter within the defuser tube with the cone end 252 bearing firmly against the defuser disc 240 about the aperture 258.

The resulting defuser disc, cone, and collar subassembly 270 are then applied to the threaded end 236 of the elbow 230, with the internal threading 244 of the collar 242 being threaded on the elbow end 236 for this purpose sufficiently to hold the subassembly 270 in firm operating position.

Cooperating with subassembly 270 is the injector shroud 272 which comprises a plate of stainless steel shaped to the cylindrical configuration indicated, with the overlapping ends being spot welded together where indicated at 274. The shroud thus is shaped to the form of cylindrical sleeve 275 having an internal diameter that exceeds the external diameter of the collar 242 by a relatively small dimension, as indicated in FIG. 8 with the collar being formed to define a plurality of spacer lugs 278 that are spaced apart about the collar periphery and are proportioned for force fit application within the shroud 272. The shroud 272 defines filtrate intake end 280 and filtrate discharge end 282, with the end 280 of the shroud 272 being force fit onto collar 242 and oriented so that its anchoring tab 284 is aligned with and disposed adjacent aperture 286 of the elbow collar 235 so that self tapping screw 290 may be applied through the tab aperture 292 and to the elbow aperture 286 to fix the shroud 272 in place. Self tapping screw 296 applied through the underside of the shroud 272 into collar 242 completes the assembly of the device 120.

The filtrate water flow pattern passed and through device 120 is indicated by the lines and arrows of FIG. 7 wherein it will be seen that the device 120, the filtrate liquid flow and the arrangement of the mixer head assembly and shroud 272 produce four distinct hydraulic flow pressure zones. Exteriorily of the shroud the water flows to the right of FIG. 7 exteriorily of the shroud 272 in a thin relatively quiescent zone 300. Within the shroud 272, the water flows past the collar 242 in a relatively thin film, subdivided by the spacer lugs 278, in a relatively quiescent zone 302. At the face of the defuser disc 240, the air or gas being injected into the water enters a void space upstream of the defuser cone 250 at a turbulent mixing zone 304. Downstream of the defuser cone about the margin of its larger end 253 is a homogenizing liquid gas mix zone of annular configuration.

During the filtration mode of operation hub device 120, an annular fraction of the in-line water flow past device 120 enters into zone 302, which represents a lower pressure thin film zone. The injected gas or air, which enters under pressure, mixes turbulently with the thin water film leaving zone 302 and entering mixing zone 304, which produces a relatively high pressure turbulent mixing zone 304. The larger end 253 of the defuser cone, which is spaced from the internal surface of the shroud 272 in relatively small annular spacing 309, approximating ⅜ths inch, provides for a funneling through such spacing of the liquid and gaseous components emerging from the high pressure turbulence zone 304 to effect complete dispersion and homogenization of the injected gas or air to the passing liquid fluid. The passing liquid flow around and exteriorily of the shroud 272 tends to create a partial vacuum or low pressure area immediately in front of the zone 306 and the flow emerging from between the defuser cone 250 and the shroud 272 swirls up into this low pressure area thus producing a turbulent molecular saturation of the injected gas and air into the water flow.

The shroud 272, diffuser cone 250, washers 256 and 260, screw 264, and nut 262, as well as screws 290 and 296 are all preferably formed from stainless steel, with the other components of device 120 being formed from the aforementioned polyvinyl chloride.

When the module 10 is in its backwash mode, the direction of water flow is the reverse of that shown in FIG. 7, with the injected gas or air effecting the aforementioned scouring action of the filtering units 62 and 42.

The fittings 110 of devices 14 and 16 are suitably connected to the respective valve devices 20 and 22 by suitable polyvinyl chloride sleeves 315, and suitable couplings, etc. that are indicated at 317 and 319.

EXAMPLE OF APPLICATION OF THE ELECTRO-CHEMICAL FILTERING MODULE

The system 11 diagrammatically illustrates the application of the module 10 in a typical recirculating closed loop cooling tower water treatment type of industrial water handling piping system. In the system 11, conduiting 320 conveys coolant water or other liquid that has been heated by the operation of industrial or machining equipment at an industrial installation 322 and conveys it to a conventional heat exchanger 324 where the heat is absorbed and the heat depleted coolant is returned by conduit 326 to the insulation 322. From the heat exchanger 324 heat bearing water is conveyed by conduiting 328 to a hot water sump 330 where the water may be, for instance 80 degrees F., from which it is supplied by a suitable pump 332 through conduit 334 to a conventional cooling tower type heat dissipation assembly 336 which may involve, for instance, coil tubing through which the heated water passes that is exposed for forced air flow produced by fans to dissipate the heat involved. The heat depleted water returns through conduiting 338 and 340 to cool water sump 342 that may have a temperature on the order of 68 degrees F., from which the cool water is supplied by suitable pump 344 through conduit 346 to heat exchanger 324 in a continuously circulating system in which the operation of the pumps 332 and 334 is timed to maintain adequate water levels in the respective sumps 330 and 342. Make up water may be supplied to sump 330 from a city water main via conduit 356.

The module 10 is appropriately mounted in and incorporated in the piping comprising the system 11 of FIG. 6 to continuously treat the water that is supplied to the cooling tower in accordance with the indicated concepts of the invention. The module 10 as shown in FIG. 6 bears reference numerals corresponding to those of FIGS. 1 and 5, from which it will be seen that the module filtrant infeed conduit 80 is connected to conduit 346 by suitable off-on valve 350, which may be set to admit a predetermined liquid flow to the module 10 for filtration treatment purposes. The gas or air supply lines or conduits 116 are connected to a suitable source of air or oxident gas under pressure, as desired, while the filtrate outflow conduits 84 and 88 are connected to conduit 340 for communicating the filtrate to sump 342. Backwash intake conduits 86 and 90 are connected to conduit 354 that is connected through suitable off-on valve 355 to the city water main for supplying the backwash water when module 10 is in its backwash mode. The backwash discharge conduit 82 is connected to, for instance, a suitable drain.

Of course, any pumps needed to insure the filtration and backwash pressures indicated may be incorporated in conduits 80 and 354.

With module 10 interconnected as to the system 11 and operated in the manner that has been described, the water supply to and from the cooling collar 336 is maintained in a continuing excellent state of purity and freedom from solids debris and foreign particulate matter.

Canisters 26 equipped with only filter unit 42 may be employed where the objective is primarily to filter out heavy and relatively large solid particulate material having little or only minor objectionable ion content. Canisters not needing filter unit 42 and providing only filter unit 60 may be employed where minor particulate solids matter of relative small size is to be removed, and the major objective is the removal of ionic matter, as in the desalting of sea water. In such cases, backwash equipment and effectuation is the same as herein described and illustrated.

The gas supplied to module 10 by injector assemblies 14 and 16 will basically depend on the application, but ozone, singlet molecular oxygen are preferred for disinfectant purposes as to biological materials, though air serves the same purposes to a limited degree and is very effective for the backwash mode. These gases also have coagulation inducting characteristics as to the solids involved by reason of the combination of molecules during oxygen, and thus the gases to be injected serve coagulation purposes as well as oxygenation and disinfectant purposes.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A filter device for recirculating liquid filtration comprising:
   a liquid filtrant receiving cylinder having a bore extending longitudinally thereof,
   means for connecting to one end of said cylinder bore the source of liquid filtrant,
   means for sealing off the other end of said cylinder,
   a cross tube connected to said cylinder and extending across said bore,
   said cross tube having a width that is less than the width of said bore,
   said cross tube having its external surfacing in sealed relation thereabout with said cylinder at either end of said tube and having one end thereof projecting from said cylinder,
   a tubular mandrel mounted in said tube and extending substantially coextensively with said tube,
   with the portions of said cross tube and said mandrel disposed within said cylinder each being formed to define multiple liquid passing apertures thereabout,
   and an elongate composite filter sheeting convoluted about said mandrel and filling the space between same and said cross tube,
   said composite filter sheeting comprising:
   a pair of foraminous electrically conductive sheets separated by a sheet of fibrous filtration material,
   means for electrically connecting said foraminous sheets to a source of direct current electrical energy in anode and cathode polarizing relationship,
   and means for discharging filtered liquid from within said mandrel.

2. The filter device set forth in claim 1 including:
   a filter unit disposed across said bore of said cylinder between said one end of same and said cross tube,
   said filter unit comprising:
   a pair of foraminous electrically conductive sheets separated by layers of fibrous filtration material,
   and means for electrically connecting said foraminous sheets to a source of direct current electrical energy in anode and cathode relation.

3. The filter device set forth in claim 2 wherein:
   said layered filter unit fibrous material is effective to filter out particle sizes down to about five microns,
   and said composite filter sheeting fibrous material is effective to filter out particle sizes down to the 0.5 to one micron range,
   said sources of electrical energy providing a direct current charge in the range of from about twelve to about twenty-four volts and five to fifty amperes.

4. The filter device set forth in claim 2 wherein:
   said means for discharging the filtered liquid from within said mandrel comprises:
   a tubular fitting connected to one end of said mandrel in filtered liquid receiving relation thereto,
   said fitting having disposed in same a gas injector head facing in the direction of flow of the filtered liquid,
   said gas head being connected to a source of oxidizing and/or ambient air gas,
   and means for substantially uniformly dispersing the gas from said head into the filtered liquid including means for effecting turbulant mixing of the gas and liquid in an annular manner downstream of and adjacent said head.

5. The filter device set forth in claim 4 including:
   means for reversing the liquid flow through said device to backwash regenerate same,
   said gas head being connected to a source of oxidizing gas and/or ambient air under pressure for gaseous scouring of said composite filter sheeting during backwash regeneration.

6. The filter device set forth in claim 2 including:
   means for reversing the liquid flow through said device to backwash regenerate same.

7. The filter device set forth in claim 2 wherein:
   said means for discharging filtered liquid from within said mandrel comprises:
   said mandrel having its ends each connected to a tubular fitting for liquid flow therefrom.

8. A modular recirculating filter device for liquid filtration comprising:
   a liquid filtrant receiving cylinder having a bore extending longitudinally thereof,
   means for connecting to one end of said cylinder bore the source of liquid filtrant,
   means for sealing off the other end of said cylinder,
   a cross tube connected to said cylinder and extending across said bore,
   said cross tube having a width that is less than the width of said bore,
   said cross tube having its external surfacing in sealed relation thereabout with said cylinder at either end of said tube and having one end thereof projecting from said cylinder,
   a tubular mandrel mounted in said tube and extending substantially coextensively with said tube,
   with the portions of said cross tube and said mandrel disposed within said cylinder each being formed to define multiple liquid passing apertures thereabout,
   and an elongate composite filter sheeting convoluted about said mandrel and filling the space between same and said cross tube,
   said composite filter sheeting comprising:
   a pair of foraminous electrically conductive sheets separated by a sheet of fibrous material,
   means for electrically connecting said foraminous sheets to a source of direct current electrical energy in anode and cathode relation,
   and means for discharging filtered liquid from within said mandrel,
   a filter unit disposed across said bore of said cylinder between said one end of same and said cross tube,
   said filter unit comprising:
   a pair of foraminous electrically conductive sheets separated by layers of fibrous filtration material,
   and means for electrically connecting said foraminous sheets to a source of direct current electrical energy in anode and cathode relation,
   said layered filter unit fibrous material being effective to filter out particle sizes down to about five microns,
   and said composite filter sheeting fibrous material being effective to filter out particle sizes down to the 0.5 to one micron range,
   said source of electrical energy providing a direct current charge in the range of from about twelve to about twenty-four volts and five to fifty amperes,
   said means for connecting the source of liquid filtrant to said one end of said cylinder including a first liquid directional flow reversing valve,
   said means for discharging the filtered liquid from said mandrel including a second liquid flow reversing valve, and means for simultaneously positioning said valves for filtering flow of the filtrant through said device in one position thereof, and for solids removal backwash liquid flow through said device in a second reverse position thereof.

9. The modular filter device set forth in claim 8 wherein:

said means for discharging the filtered liquid from within said mandrel comprises:

a tubular fitting connected to one end of said mandrel in filtered liquid receiving relation thereto, said fitting having disposed in same a gas injection head facing in the direction of flow of the filtered liquid, means for connecting said gas head to a source of oxidizing and/or ambient air gas under pressure, and means for substantially uniformly dispersing the gas from said head into the filtered liquid including means for effecting turbulent mixing of the gas and liquid in an annular manner downstream of and adjacent said head, said head being disosed between said one end of said mandrel and said second valve, whereby on said reverse backwash liquid flow through said device the dispersed gas effects gas scrubbing and hydraulic pulsation in said fibrous material of said composite filter sheeting and said filter unit for solids removal regeneration of same.

10. The method of filtering out solid and ionic foreign matter and contaminants from a recirculating liquid filtrant, which method comprises the steps of:

passing the filtrant in a confined liquid pressure flow in a substantially rectilinear direction transversely through an electrically polarized coarse fibrous filter material layers while coagulating and coalescing the solids into larger particle size for entrapment therein and electrical attraction of contaminant ions therein, then directing the filtrant flow about the periphery of a rolled up and electrically polarized anode-fine fibrous filter material sheet-cathode sandwich, pressure filtering the filtrant through the sandwich to its core while electrically charging the solids to form molecular chain clusters and physically and electrically trapping such clusters within the filter sheet with the further electrical adhesion of contaminant ions into the sandwich entrapped solids clusters, and passing the filtrate from the sandwich core.

11. The method set forth in claim 10 wherein:

oxidizing and/or ambient air gas is injected into the recirculating filtrate and uniformly mixed therein for the purpose of additional oxidation-coagulation of dissolved solids into larger more filtrable particle size.

12. The method set forth in claim 11 including:

sensing the pressure of the pressure flow upstream of the two filtering steps, and when the pressure of same reaches a predetermined maximum, reversing the liquid flow to backwash the solids from the filter material, and while the backwashing step is proceeding, gas scrubbing the fibrous material for removing the filtered out solids therefrom.

13. The method set forth in claim 12 wherein:

in practicing the gas scrubbing step the fibrous material is expanded and vibrated.

14. A filter device for recirculating liquid filtration comprising:

a liquid filtrant receiving cylinder having a bore extending longitudinally thereof, means for connecting to one end of said cylinder bore the source of liquid filtrant, means for sealing off the other end of said cylinder, a filter unit disposed across said bore of said cylinder between said one ends of same, said filter unit comprising:

a pair of foraminous electrically conductive sheets separated by layers of fibrous filtration material, means for electrically connecting said foraminous sheets to a source of direct current electrical energy in anode and cathode relation for polarizing same, said layered filter unit fibrous material being effective to filter out particle sizes down to about five microns, means for discharging the filtrate from the cylinder downstream of said filter unit, means for reversing the liquid flow through said device to backwash regenerate same, and means for air scrubbing said filter unit when being backwashed.

* * * * *